United States Patent [19]

Mangam, Jr. et al.

[11] 4,232,531
[45] Nov. 11, 1980

[54] THERMOSTATIC CONTROL APPARATUS FOR EVAPORATIVE COOLING SYSTEM

[75] Inventors: William M. Mangam, Jr.; John J. Willis, Jr.; Myron Jones, Jr., all of Phoenix, Ariz.

[73] Assignee: Dial Manufacturing, Inc., Phoenix, Ariz.

[21] Appl. No.: 53,243

[22] Filed: Jun. 29, 1979

[51] Int. Cl.³ .................. F28D 3/00; F25D 17/00
[52] U.S. Cl. ........................ 62/171; 62/179; 62/180
[58] Field of Search ............... 62/171, 179, 180

[56] References Cited

U.S. PATENT DOCUMENTS

| 4,090,370 | 5/1978 | Vaughan | 62/171 |
| 4,129,140 | 12/1978 | Carlin | 62/171 |
| 4,146,086 | 3/1979 | Hobbick et al. | 62/180 |

FOREIGN PATENT DOCUMENTS 2237852  2/1974  Fed. Rep. of Germany ............ 62/171

Primary Examiner—William E. Wayner
Assistant Examiner—Harry Tanner
Attorney, Agent, or Firm—H. Gordon Shields

[57] ABSTRACT

Thermostatic control apparatus for evaporative cooling systems includes a single thermostat and a plurality of relays and relay contacts to select appropriate combinations of cooling, ventilating, and motor control speed for a fan or a blower.

9 Claims, 6 Drawing Figures

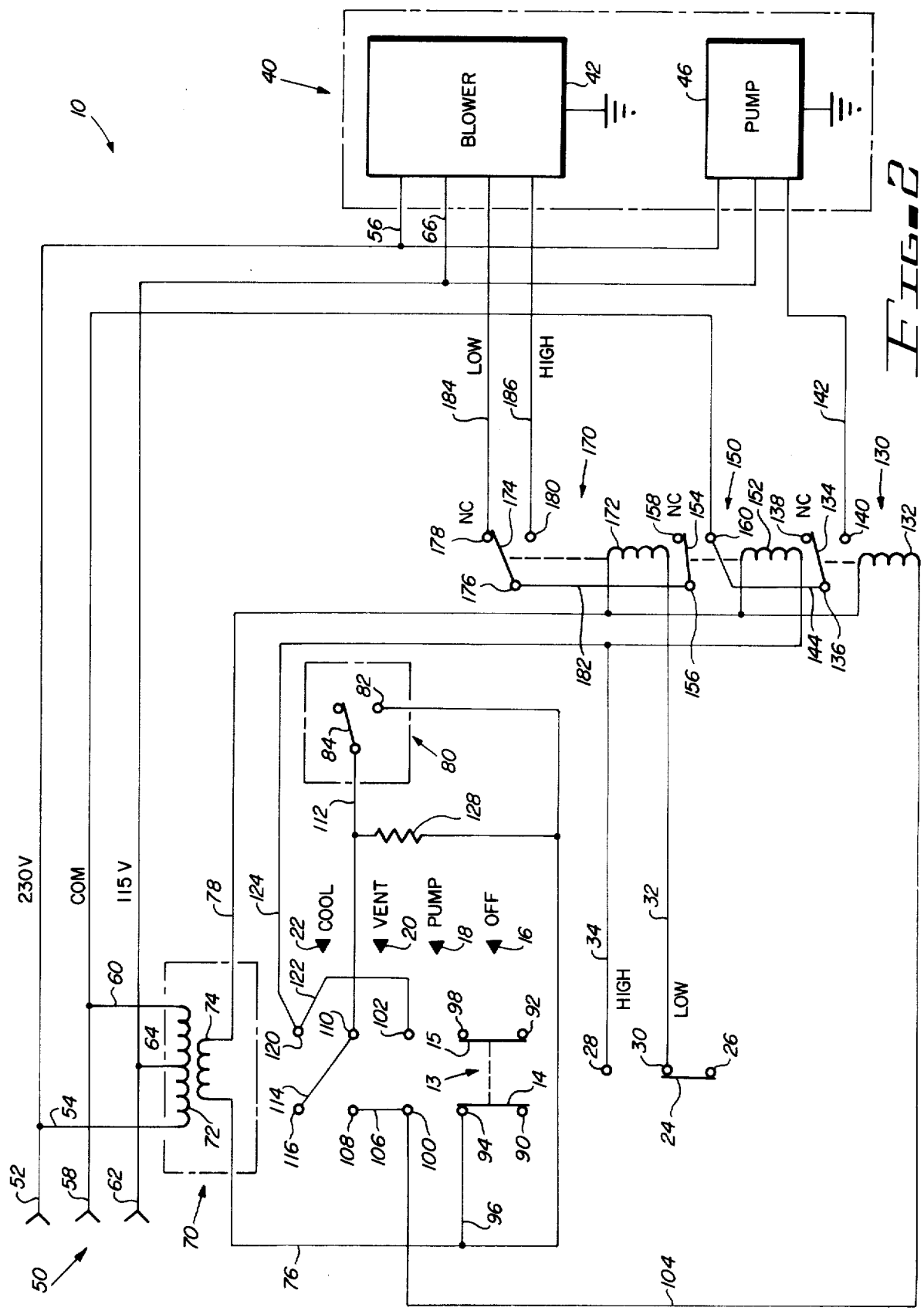

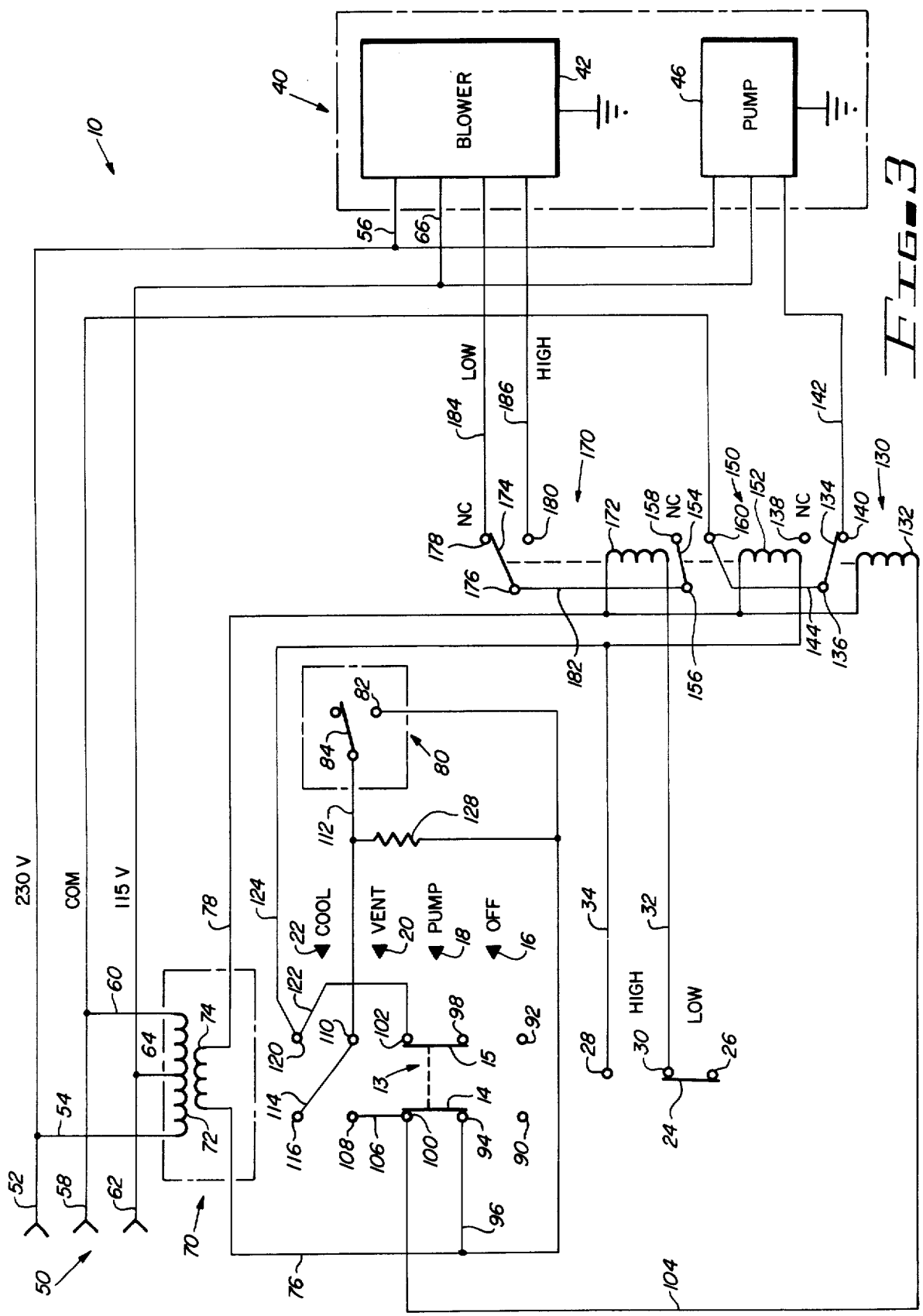

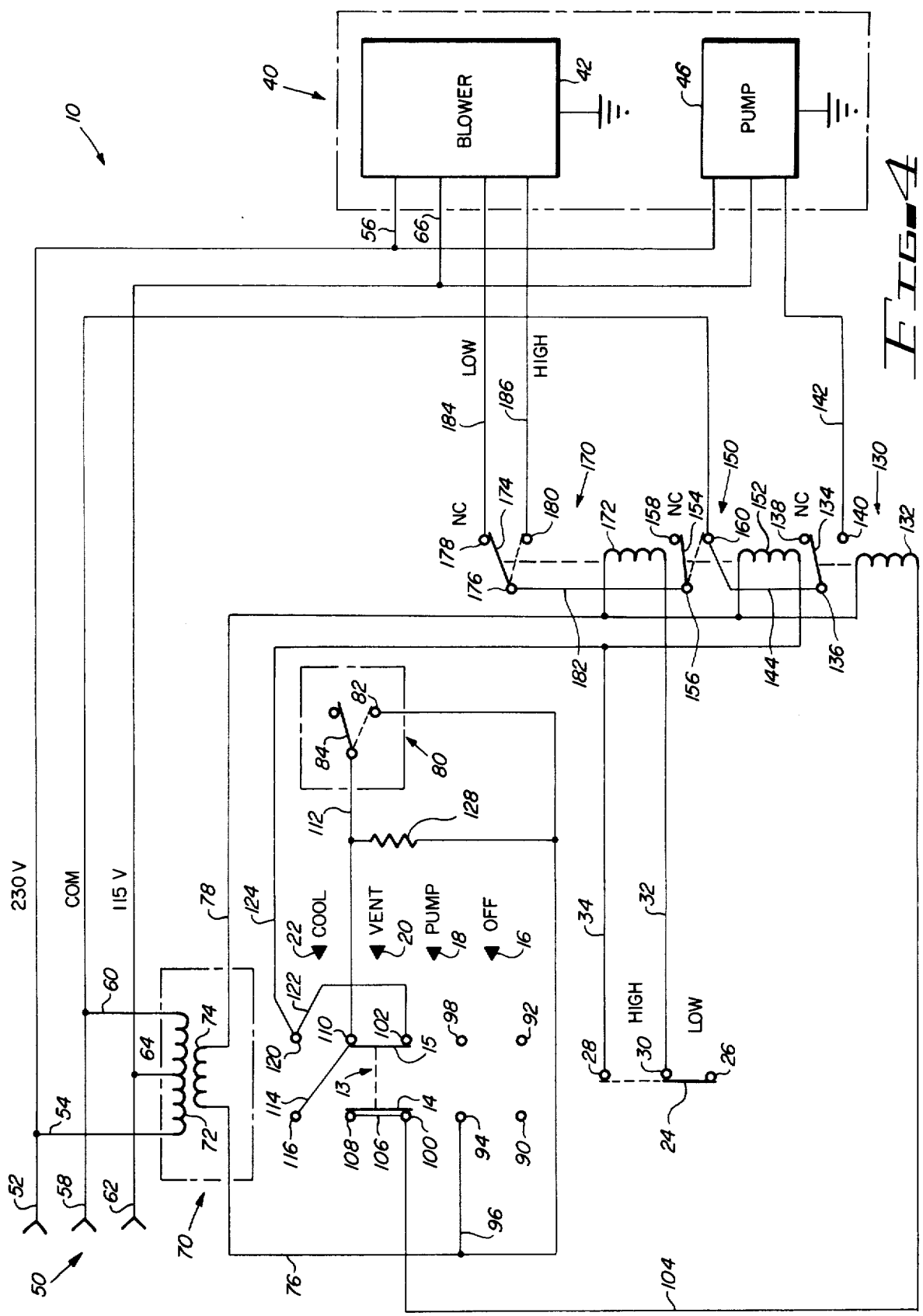

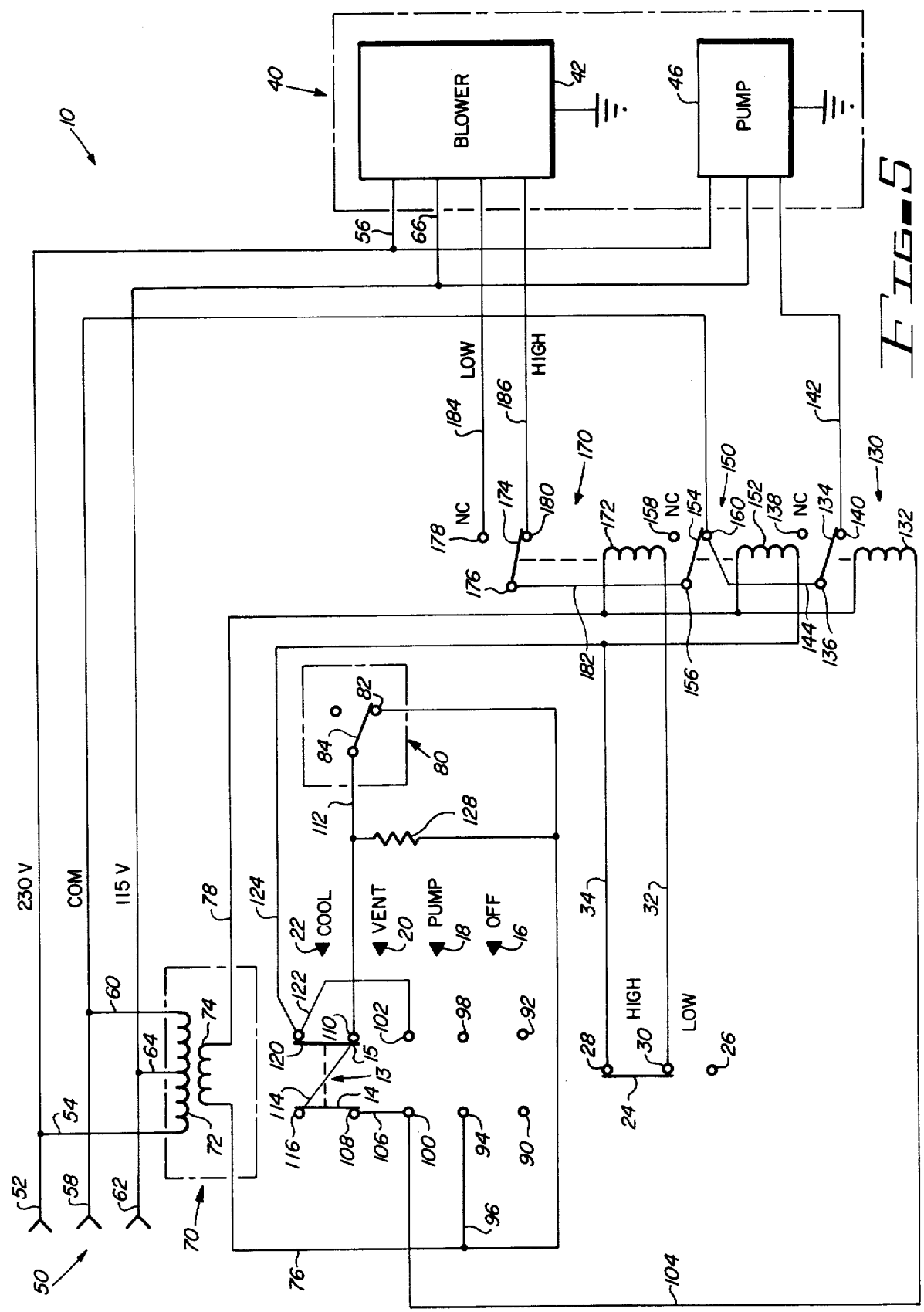

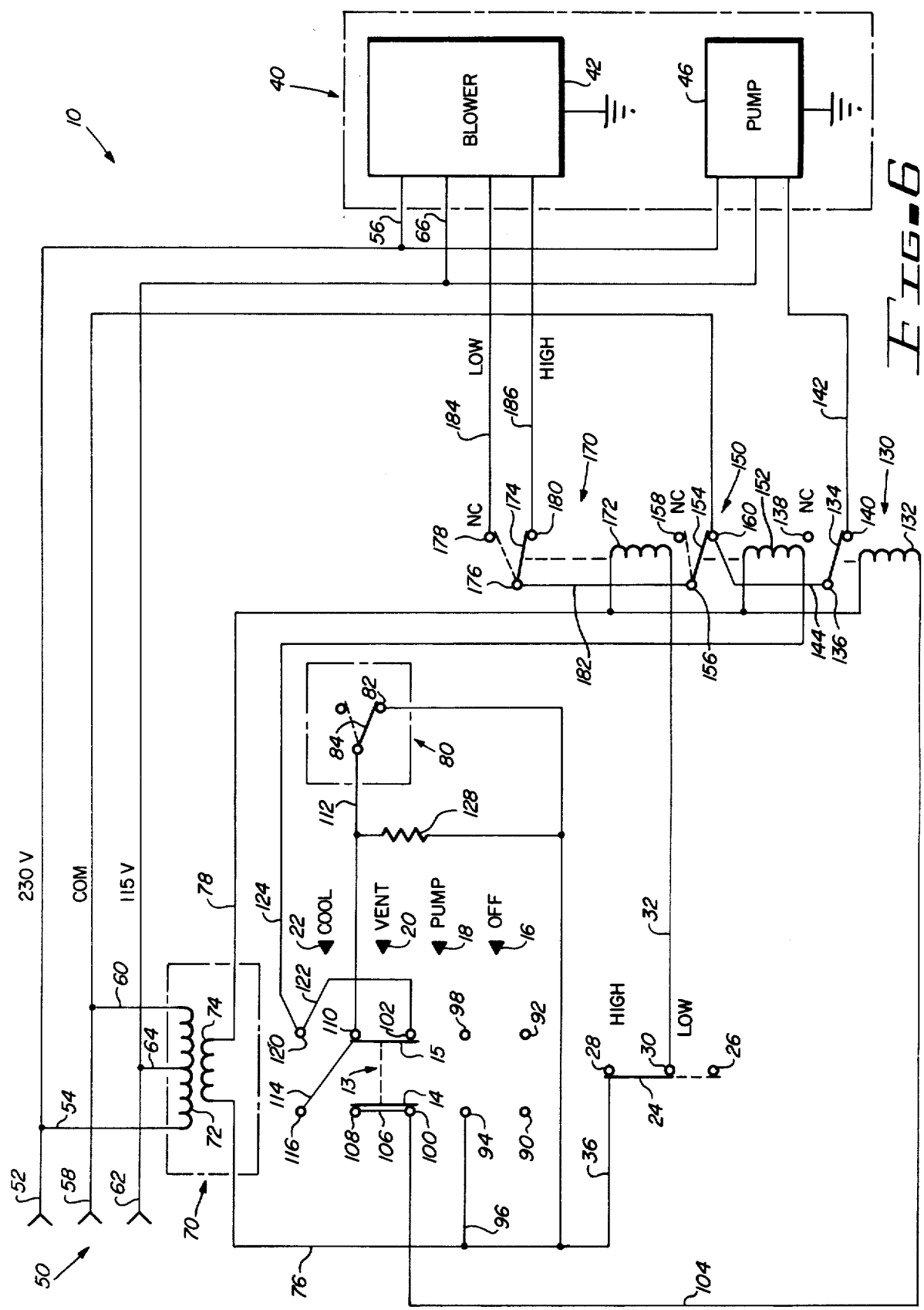

a
THERMOSTATIC CONTROL APPARATUS FOR EVAPORATIVE COOLING SYSTEM

BACKGROUND OF THE INVENTION

1. Field of the Invention

This invention relates to evaporative cooling systems and, more particularly, to evaporative cooling systems which employ a two-speed motor and a pump for pumping water for saturating pads through which air is forced by a fan or blower powered by the two-speed motor, and with thermostatic control to actuate the apparatus.

2. Description of the Prior Art

In geographical areas where humidity is low during hot weather, evaporative cooling systems are used to lower the temperature of the air by increasing the humidity of the air. The hot, dry air is forced by a blower or fan through pads saturated with water. A water pump is used to lift water from a reservoir to the tops of the pads. The water then flows downwardly, by gravity, through the pads, soaking them, and back to the reservoir. The flow of air through the water-saturated or soaked pads causes the water to evaporate, and the heat of vaporization given off by the air as the water is evaporated results in a decrease in the temperature of the air. As relative humidity increases, the efficiency of such evaporative cooling system decreases. However, where relative humidity is low, evaporative cooling systems function quite satisfactorily for reducing the temperature of the air.

For enhancing the workability or efficiency of evaporative coolers, several options are available. Each of the options requires a separate control. With the apparatus of the present invention, the options are integrated into a single control.

A two speed motor may be used with an evaporative cooler to provide two different air flow rates. The amount of cooling may thus be varied to suit the circumstances of any particular situation.

Another option with respect to evaporative cooling systems is the control of the water pump separate from the blower. For presoaking the cooler pads, the pump should be on before the blower is turned on. This presoaking allows the evaporative cooler to be functionally effective as soon as the blower is turned on. If the pump and blower are turned on at the same time, there is a time lag in the operational effectiveness of the cooler because of the extra time required to fully soak or saturate the pads. The moving air may evaporate the water from the pads almost as fast as the water is pumped in, depending on the circumstances of temperature, humidity, etc., decreasing the effectiveness of the cooler. Accordingly, there is a time lag between the turning on of both blower and pump and the full effectiveness of the system. This time lag is greater than the time required to presoak the pads by turning the pump on before turning on the blower.

Two separate switches are required to control the pump and the blower separately. In the prior art, these switches are manually operated in two separate operations.

There is also another advantage of being able to control the blower or fan separately from the water pump. When the water is off, no water is flowing to the pads and the flow of air through the pads is therefore direct, without the benefit of cooling by the evaporation of the water. There are times when merely a flow of air is sufficient for cooling purposes and accordingly the pump is not required.

The prior art evaporative cooling systems generally comprise two separate switches, a switch for controlling the fan or blower, and a separate switch for controlling the operation of the pump, if such capability or option is used. If not, then a single switch is used to control both the blower and the pump in parallel. There have been individual situations where a thermostat has been used to control the operation of an evaporative cooling system, but such thermostatic control has been of a relatively elemental level, comprising only the actuation of a single speed blower motor by itself, or the actuation of a blower motor and a water pump, tied together. The option of selecting a particular speed of a motor, or a particular speed with or without an accompanying water pump, has not heretofore been accomplished by a single control.

SUMMARY OF THE INVENTION

The invention described and claimed herein comprises a thermostatic control system for an evaporative cooling system which includes a two speed motor with separate functions for selecting the speed of a two speed blower or fan motor and the selection of whether the blower or fan motor is to be operated with or without a water pump, utilizing a single thermostat, a plurality of relays, and a plurality of relay contacts.

Among the objects of the present invention are the following:

To provide new and useful evaporative cooling apparatus;

To provide new and useful control apparatus for an evaporative cooling system;

To provide new and useful thermostatic control apparatus for an evaporative cooler;

To provide new and useful thermostatic control apparatus having a plurality of relays for controlling the functions of blower motor speed and water pump operation in an evaporative cooling system; and To provide new and useful control apparatus for selecting the speed of a two speed blower motor independently of the operation of a water pump in an evaporative cooling system.

BRIEF DESCRIPTION OF THE DRAWING

FIGS. 2–5 are schematic circuit diagrams of the apparatus of the present invention sequentially illustrating the operation of the apparatus of the present invention.

FIG. 6 is a schematic circuit diagram of an alternate embodiment of the apparatus of the present invention.

DESCRIPTION OF THE PREFERRED EMBODIMENT

Figure 1:
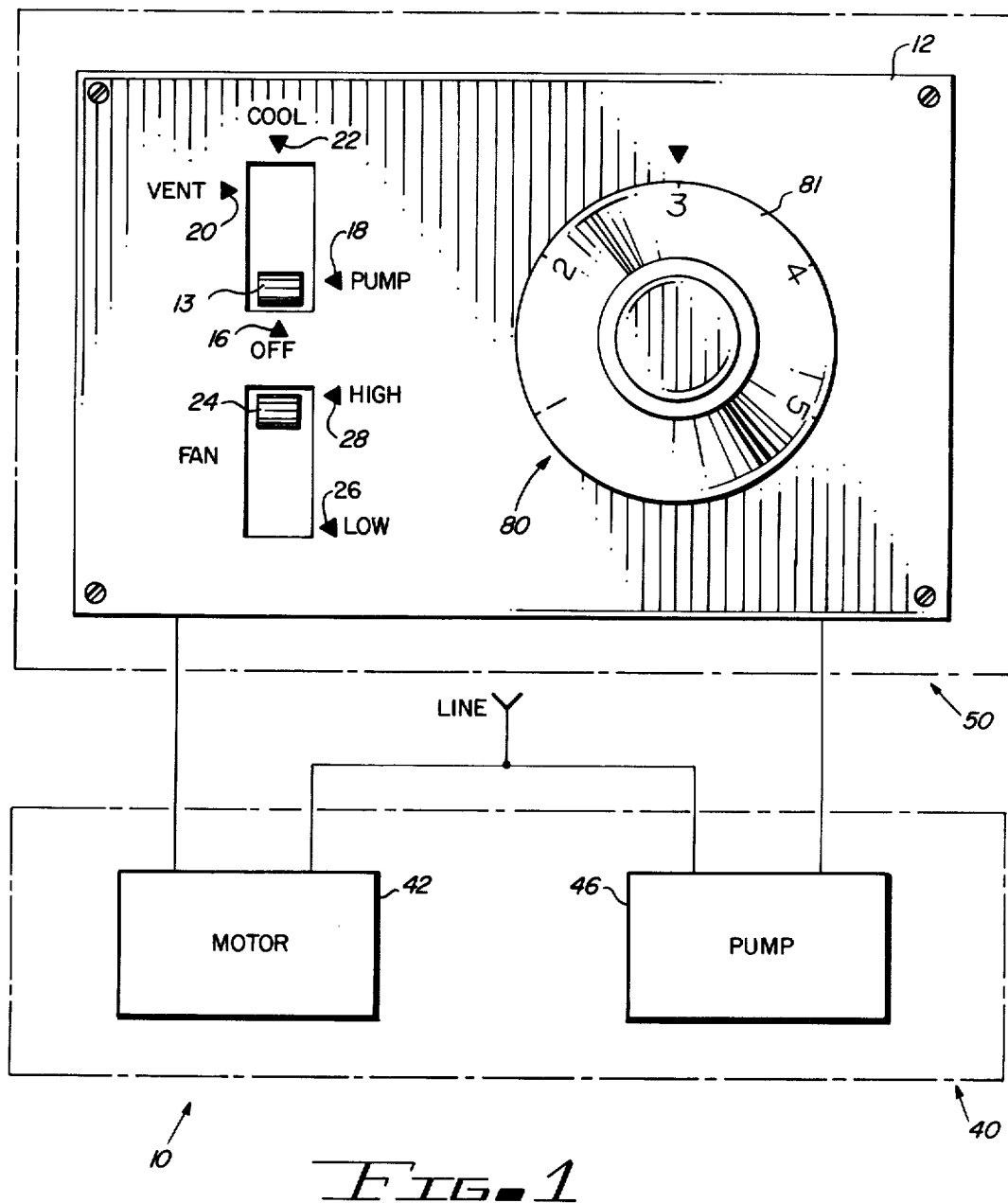
FIG. 1 is a schematic representation of the control panel showing the controls included in the apparatus of the present invention.

FIG. 1 comprises a schematic diagram of control apparatus 10 embodying the present invention. Included in the diagram are blocks representing the various components which comprise the apparatus of the present invention. The first block shown in FIG. 1 is a control panel 12 having three switches, including a four position switch 13, a two position switch 24, and a thermostatic control switch, or temperature setting knob 81, associated with a thermostat 80. The switches 13, 24, and 80 control the functioning of a two-speed fan or blower motor 42 and a water pump 46, both of which are shown in FIG. 1 as being inside a block 40 which represents an evaporative cooler.

While the pump 46 includes an electric motor, whenever the term "motor" is used herein by itself, it will be understood that the term refers to the two-speed fan or blower motor 42. The pump motor will be referred to herein simply as "the pump" or "the pump motor" to differentiate it from the fan or blower motor 42.

A block 50 representing control circuitry, including a plurality of relays, is shown encompassing the control panel 12 and located remotely from the evaporative cooler 40. Power is derived from line conductors, shown in FIG. 1 by a single line going to both the cooler 40 and the control block 50. It will be discussed in detail below. The control panel 12, and the circuitry associated therewith, such as a thermostat, may be located remotely from the cooler 40. Typically, a thermostat is located within a structure, such as a home or building, and other control elements, such as relays and the like, are located as close as is convenient to the evaporative cooler.

The four position switch 13 may be referred to as the master control switch because it provides the basic power for controlling the motor 42 and the pump 46. It must be in one of its "on" positions in order for the thermostat 80 to perform its function of turning on and off the fan motor 42 and the water pump 46 in accordance with the temperature requirements. However, as will be discussed below, the pump 46 may be turned on to presoak the cooler pads when the switch 13 is at a pump position 18 and when the contacts of the thermostat 80 are open. The fan switch 24 is used to select either the low speed or the high speed function of the motor 42.

The switch 13 includes an "off" position 16, in which power is cut to the apparatus 10 and accordingly the evaporative cooler is off, with both the fan motor 42 and the water pump 46 inoperative. The "off" position is accordingly the first position of the switch 13.

The second position of the switch 13 is indicated by reference numeral 18 in FIG. 1, and it is designated as a "pump only" position. The third position of the switch 13 is indicated as the "vent" position by reference numeral 20. The fourth position for the switch 13 is indicated by reference numeral 22, and it comprises what is identified as the "cool" position.

When the switch 13 is moved from its "off" position 16 to its "pump" position 18, the water pump 46 only is actuated for presoaking cooler pads in the evaporative cooler 40, regardless of the setting of the temperature setting knob 81, and regardless of the status of the contacts of the thermostat 80, associated therewith.

When the switch 13 is moved to the "vent" position 20, the fan motor 42 is actuated, but the pump 46 is not actuated. The vent position 20 works in conjunction with the fan switch 24, which is a two position switch and includes a low position 26 and a high position 28. The thermostat 80 must be "on" (contacts closed) in order for the "vent" and "cool" positions to operate.

The fan or blower motor 42 includes low speed and high speed windings which in turn control the speed of the motor. When the switch 24 is in the low position 26, the low speed windings of the motor 22 are electrically connected to a source of voltage and the speed of the motor is accordingly low. When the switch 24 is moved to the high position 28, the high speed windings of the motor 42 are connected to a source of voltage and the motor accordingly operates at high speed. It will be noted that the fan switch 24 does not perform an on/off function with respect to the motor 42. Rather, the fan switch 24 performs only the function of selecting the low speed or high speed windings of the motor 42 to produce either the low speed or the high speed thereof.

When the function switch 13 is moved to the cool position 22, both the pump 46 and the fan motor 42 are operational, but the overall operation of both the motor 42 and the pump 46 is through the thermostat 80.

The thermostat 80 includes electrical contacts (see FIGS. 2-6) which "make" or close on a temperature rise for cooling purposes. That is, when the temperature of the air surrounding the thermostatic switch 80 increases to a predetermined temperature, in accordance with the setting of the temperature setting knob 81 of the thermostat 80, switch contacts in the thermostat are closed to actuate both the motor 42 and the pump 46. At such time as the temperature of the ambient air is reduced below a predetermined point, the thermostat contacts open to turn off the motor 42 and the pump 46.

It will be noted that the thermostat 80 also controls the operation of the motor 42 when the function switch 13 is in the vent position 20. That is, the operation of the motor 42, without the pump 46, may be actuated in response to the thermostat 80 when the switch 13 is in the vent position 20. However, when the switch 13 is in the pump position 18, the pump motor 46 is actuated regardless of the setting of the thermostat, and independently of the operation of the thermostat 80.

FIGS. 2-5 comprise schematic circuit diagrams of the thermostatic control apparatus 10, illustrating the details of the circuitry involved in the control circuitry 50. As indicated above, the control circuitry 50 comprises the panel 12, and the electrical components associated therewith, including three relays and the various conductors for electrical current for providing current to the motor 42 and the pump 46, and the like. FIGS. 2-5 illustrate sequential operation of the apparatus 10 in the different modes or conditions, according to the setting of the control switches 13 and 24 and the status of the temperature responsive thermostat 80. While ground conductors are not specifically identified and discussed, it will be understood that the blower or fan motor 42 and the pump motor 46 are appropriately grounded, and that appropriate electrical codes are complied with by the apparatus.

The evaporative cooler 40 is shown with the blower 42 and the pump 46 each having several electrical connections. Electrical line current extends to the blower, the pump, and also to the control circuitry 50 from three input conductors. The three input conductors shown include a conductor 52, which is a 230-volt line, a conductor 58, which is a 115/230 volt common hot line, and a conductor 62 which is a 115-volt line. Thus, it will be noted that the blower 42 and the pump 46 may be operated from either a 115-volt source or a 230-volt source.

Conductor 52 extends to the pump 46, with a conductor 56 extending from the conductor 52 to the blower 42. The common conductor 58 extends to a terminal 60 of a relay 150 in the control circuitry, as will be discussed in detail below. The conductor 62 extends to the pump 46, and a conductor 66 extends from the conductor 62 to the blower 42. The schematic representation of FIG. 2 indicates that the motors for the blower 42 and the pump 46 may be either 115-volt or 230-volt motors, and accordingly the apparatus of the present invention is easily adapted to operate on either 115-volts or 230-volts.

For the control circuitry 50, a transformer 70 is used to transform line voltage down to signal voltage. The transformer 70 includes a primary winding 72 and a secondary winding 74. The primary winding 72 is connected by a conductor 54 to the 230-volt line 52, and by conductor 60 to the common conductor 58. The primary winding 72 is also center tapped for connection by conductor 64 to the 115-volt line 62. The output of the secondary winding 74 is twenty-four volts, regardless of the input to the dual voltage primary winding 72, whether on conductor 54 or on conductor 64.

With respect to the apparatus of the present invention, it is obvious that both conductors 52 and 62 will not be used at the same time. The apparatus will be used with either 230 volts (and conductor 52) or 115 volts (conductor 62). However, both are shown. By using a dual voltage primary transformer, the same central circuitry may be used for both 230and 115-volt evaporative coolers.

One side of the secondary winding 74 of the transformer 70 is connected by a conductor 76 to a contact 82, which is a fixed contact, of the thermostat 80. The thermostat 80 also includes a movable arm or armature 84, which is temperature responsive. Since the thermostat 80 is responsive to a temperature rise, the movable arm or armature 84 makes electrical contact with the contact 82 at a predetermined temperature. The temperature at which the contacts "make" may be varied by rotating the thermostatic control or temperature setting knob 81, shown in FIG. 1. Such arrangement is well known and understood in the art. The knob 81 shows five numerals, 1–5, spaced apart from each other. The five represent a temperature spread of several degrees, with number 1 being the warmest setting and number 5 being the coldest setting. The user may select an appropriate setting for the knob, and the selected setting controls the temperature at which the movable contact 84 makes or closes with the fixed contact 82 to actuate the apparatus 10.

The other side of the secondary winding 74 of the transformer 70 is connected by a conductor 78 to one side of three relay coils, namely a relay coil 132 of a relay 130, a relay coil 152 of a relay 150, and a relay coil 172 of a relay 170. The relay 130 controls the pump 46. The relay 150 comprises a master relay for controlling the blower 42 and also the pump 46 in the vent and cool positions, as will be discussed in detail below. The relay 170 controls the high and low speed of the blower 42.

The slide switch 13 includes a pair of sliding conductors or switches 14 and 15 which are ganged together for common movement. The switch 13 is movable from an off position 16 to a pump position 18, vent position 20, and a cool position 22, all of which were discussed above in conjunction with FIG. 1. The four positions each include four terminals, or two terminals for each slide conductor or switch 14 and 15.

In FIG. 2, the switch 13 is shown in its off position, with the sliding contact or slide switch 14 connected between a pair of terminals 90 and 94, and the sliding contact or switch 15 connected between a pair of terminals 92 and 98. The terminals 90 and 92 are not electrically connected to any other element in the system. The conductor 98 is similarly not connected to any other element in the system. However, the terminal 94 is connected by a conductor 96 to the conductor 76, which is in turn connected to one side of the secondary coil 74 of the transformer 70. Above the terminal 94 is a terminal 100, which is connected by a conductor 104 to the other end of the relay coil 132 of the relay 130. As discussed above, the one side of the relay coil 132 is connected by the conductor 78 to the other side of the secondary coil 74 of the transformer 70. Spaced above the terminal 100 is a terminal 108, which is connected to the terminal 100 by a conductor 106. Above the terminal 108 is the fifth terminal for the slide switch 14, namely a terminal 116.

For the sliding contact or slide switch 15, above the terminal 98 is a terminal 102, and above the terminal 102 is a terminal 110. Finally, the fifth terminal for the slide switch 15 is a terminal 120. A conductor 122 extends between the terminals 102 and 120. A conductor 114 extends between the terminals 116 of the slide 14 and terminal 110 of the slide switch 15. From terminal 120, a conductor 124 extends to the other side of the coil 152 of the relay 150.

A conductor 112 extends from the movable arm 84 of the thermostat 80 to the terminal 110. The movable arm or armature 84 of the thermostat is thus connected to terminals 110 and 116.

A cooling anticipator resistor 128 is placed across the conductors 76 and 112 to provide a very small current for the movable armature 84 of the thermostat 80. The heat generated by the flow of current through the resistor 128 helps to anticipate the closing of the contact or armature 84 with the contact 82 of the thermostat 80 which enables the blower and the pump to operate. The current passed by the resistor 128 is not sufficient to actuate the relays, and accordingly does not furnish a current path for the signal circuitry. Rather, the current path for the signal circuitry is through the thermostatic contacts 82 and 84, as discussed below.

As indicated above, the off position 16 includes four terminals, terminals 90 and 96 for the sliding contact 14, and terminals 92 and 98 for the sliding contact 15. The pump position 18 includes terminals 96 and 100 for the sliding contact 14, and terminals 98 and 102 for the sliding contact 15.

For the vent position 20, sliding contact 14 is electrically connected to contacts 100 and 108, which are also tied together by the conductor 106, and the sliding conductor or contact 15 is connected to the contacts 102 and 110. In the cool position 22, the sliding contact 14 is in electrical connection with the terminals 108 and 116, and the sliding contact 15 is electrically connected to the terminals 110 and 120.

For high and low speed operation of the blower 42, there are three terminals, namely a terminal 26, a terminal 30, and a terminal 28. In the low speed position, the switch 24 is in electrical contact with the terminals 26 and 30. The terminal 30 is tied to the other side of the relay coil 172 of the relay 170 by a conductor 32. For the high speed action of the blower 42, the slide switch 24 is electrically connected to terminals 30 and 28. A conductor 34 extends from the terminal 28 to the conductor 124.

It will be noted again that the conductor 78 extends from one side of the secondary coil 74 of the transformer 70 to one side of the coils 132, 152, and 172, respectively, of the relays 130, 150, and 170. Accordingly, one side of the relay coil for each relay is energized directly from one side of the secondary winding 74 of the transformer 70. The other side of the transformer secondary winding 74 is connected to the relay coils 132, 152, and 172 from conductor 76, indirectly, through the switches 13 and 24 and the thermostat 80. That is, conductor 76 is the only conductor connected directly to the one side of the secondary winding 74, and accordingly the circuit path through each of the relay coils must ultimately be traced through conductor 76, as will be discussed below.

The relay 130 includes the relay coil 132, and a moving armature 134 is actuated by the relay coil 130. The armature 134 is connected to a terminal 136 at its fixed end, and the armature 134 moves between a pair of contact points 138 and 140. The contact point or terminal 138 is normally closed by the armature 134, and the relay contact 140 comprises the normally open contact. When a current flows through the relay coil 132, the armature 134 moves from the contact 138 to the contact 140, closing the contact 140 to provide a current path from the common conductor 58 to the terminal 160, and through a conductor 144, which extends from the terminal 160 to the terminal 136, and through the armature 134 to the terminal 140. A conductor 142 extends from terminal 140 to the pump 46. Thus, when relay 130 is energized, current flowing through the relay coil 132 causes the pump 46 to be connected to the line 58 to cause the pump 46 to operate.

The relay 150 includes a relay coil 152, one end of which is connected to the conductor 78 and accordingly to one side of the secondary winding 74 of the transformer 70. The other end of the relay coil 152 is connected by the conductor 124 to the terminal 120. The terminal 120 is associated with the selector switch 13, and will be discussed in detail below.

An armature 154 is actuated by the relay coil 152. The armature 154 is connected to a fixed terminal 156 and it moves between a pair of relay contacts 158 and 160. In the normally closed position, the armature 154 is in electrical contact with the terminal 158. Accordingly, terminal 160 comprises the normally open contact for the relay 150.

When an electrical current flows through the relay coil 152 to actuate the relay 150, the armature 154 moves from its normally closed position, in contact with terminal 158, to its normally open position, closing the normally open contact 160. The armature 154 accordingly allows current to flow from the common line 58 to the terminal 160, and through the armature 154 to the terminal 156. The terminal 156 is connected to a fixed terminal 176 of the relay 170 through a conductor 182.

The relay coil 172 of the relay 170 includes an armature 174 which is connected to the terminal 176. A pair of relay contacts 178 and 180 are respectively connected to the blower 42 by conductors 184 and 186. The armature 174 is shown in FIG. 2 in contact with the normally closed terminal 178, and the terminal 180 comprises the normally open contact for the relay 170. The conductor 184 extends from the normally closed contact 178 to the low speed windings of the blower motor 42. The conductor 186 extends from the normally open relay contact 180 to the high speed winding of the blower 42. The speed of the blower 42 accordingly is controlled by the position of the armature 174 of the relay 170.

One side of the relay coil 172 is connected to the one side of the secondary winding 74 of the transformer 70 by the conductor 78. The other side of the relay coil 172 is connected by the conductor 32 to the terminal 30, which is associated with the blower speed switch 24.

In FIG. 2, the control apparatus 10 is in its "off" mode, with the three relay armatures 134, 154, and 174 connected to the normally closed contacts of the relays. The switch 13 is in its "off" position, with the slide switches 14 and 15 making contact with terminals 90, 94, and terminals 92, 98, respectively. The movable or thermostatically actuated switch 84 is open, not in electrical contact with the terminal 82, and the thermostat 80 is accordingly open. Furthermore, there is no current flow through the cooling anticipator resistor 128. Since the switch 13 is off, the setting of the blower speed switch 24 is immaterial.

In FIG. 3, the apparatus 10 is shown schematically with the function switch 13 moved from its "off" position to its pump position 18. In the pump position 18, the slide contact 14 of the switch 13 makes electrical contact between the terminals 94 and 100, and the slide contact 15 makes electrical connection with or between the terminals 98 and 102. Since terminal 98 is not electrically connected in the control circuitry 50, no current flows through the slide contact 15. However, with the slide contact 14 electrically connected to terminals 94 and 100, a current path is established between the secondary winding 74 of the transformer 70 by way of conductor 96 to the terminal 94 from the conductor 76. The current path continues from the terminal 94 through the sliding contact 14 to the terminal 100. The conductor 104 extends from the terminal 100 to the relay coil 132, which causes the relay coil 132 to be energized, since one side of the coil 132 is connected directly to the transformer coil 74 by conductor 78.

When the relay coil 132 is energized, the armature 134 moves from terminal 138 to the terminal 140, thus closing the normally open contacts of the relay 130. From terminal 140, the conductor 142 extends to the pump 46. The pump 46 accordingly turns on because a current path is established between the common conductor 58 through the terminal 160 of relay 150, conductor 144, armature 134, terminal 140, and conductor 142 to the pump 46. The pump is also connected to a source of electrical current either on the 230 volt line 52 or the 115 volt line 62. The pump 46 accordingly is turned on to presoak the cooler pads of the cooler 40.

It will be noted that the blower is not actuated because relay 150 remains off, regardless of the setting of the switch 24 and the thermostat 80.

When the function switch 13 is moved to the vent position 20, as shown in FIG. 4, the sliding contact 14 is in electrical contact with terminals 100 and 108, which terminals are also connected directly by the conductor 106. The sliding contact 15 is in electrical contact with the terminals 102 and 110. When the switch 13 moves from the pump position 18 to the vent position 20, electrical connection between the terminal 94 and the terminal 100 by the sliding conductor 14 is accordingly broken, and the pump 46 turns off because the relay coil 132 is deenergized. This causes the armature 134 to move to its normally closed position, in contact with the relay contact or terminal 138. This opens the normally open contact 140 which in turn opens the circuit between the conductor 58 and the conductor 142 to cause the pump 46 to turn off.

With the thermostatic element 84 in its open position, both the pump 46 and the blower are off. The pump 46 is off for the reasons given above, and the blower 42 is also off because there is no current path through either its low speed or high speed windings. However, a current path is established through the anticipatory cooling resistor 128 from the secondary winding 74 and conductor 76, through the resistor 128, to the conductor 112, to terminal 110, through the sliding contact 15, the terminal 102, conductor 122, terminal 120, conductor 124, the relay coil 152, and conductor 78, back to the secondary winding 74. It will be noted that the current flow through the relay coil 152 is so slight that the relay 150 will not be actuated. Rather, the very small current flow through the resistor 128 serves merely to provide some heat to the movable element 84 of the thermostat 80.

When the thermostatic switch 84 of the thermostat 80 closes to make electrical contact with the terminal 82, as shown in phantom in FIG. 4, a current path is established through the coil 152 of the relay 150 from conductor 78 and the one side of the secondary winding 74 of the transformer 70, through the relay coil 152, and to terminal 120 through conductor 124. From the terminal 120, the current flows through conductor 122 to the terminal 102, and the sliding contact 15 to the terminal 110. From the terminal 110 the current continues to flow through conductor 112, the thermostatic element 84, the terminal 82, and conductor 76 to the other side of the secondary winding 74.

The movable elements are sometimes shown in phantom or dotted line position. For simplicity, this will simply be referred to as "shown in phantom".

With the current flowing through the coil 152 of the relay 150, the armature 154 moves to open the normally closed contact 158 and close the normally open contact 160. The closing of the contact 160 accordingly establishes a current path through the blower 42 from either the 230-volt line 52 or the 115-volt line 62, and to the common line 58 at the contact 160 through the low speed conductor 184, the normally closed contact 178 and the armatuure 174 of the relay 170, and from the armature 174 to the terminal 176, the conductor 182, the terminal 156, and the armature 154 which is now closing the normally open contact 160. The actuated position of the armature 154, against the contact 160, is shown in phantom in FIG. 4.

The above described current path through the low speed windings of the blower 42 through the conductor 184, and the normally closed contact 178 and armature 174 of the relay 170, assumes that the slide switch 24 remain in its low position, with the slide switch extending between the contacts 26 and 30. In the low speed position, the relay 170 is not actuated, and accordingly the armature 174 remains in its closed position. However, if high speed operation of the blower 42 is desired, the switch 24 may be moved from its low position to its high position, with the slide switch 24 making electrical contact with the terminals 30 and 28, as shown in phantom in FIG. 4. When the switch 24 closes the terminals 28 and 30, a current path is established through the relay coil 172 of the relay 170 from one side of the secondary winding 74 through conductor 78, and through conductor 32 to the terminal 30. From the terminal 30, the current flows through the slide switch 24 to the terminal 28, and to conductor 124 from terminal 28 on conductor 34. The current path from conductor 124 is through the thermostat 80 to the conductor 76 and back to the transformer 70, as described above in conjunction with the relay coil 152 of the relay 150.

When the relay 170 is actuated, the armature 174 moves from the normally closed contact 178 to the normally open contact 180. When the normally open contact 180 closes, a current path is then established to the blower 42 and its high speed windings through conductor 186 and the relay contact 180. The current through the high speed windings is accordingly from the conductor 182 and the terminal 176, the armature 174, and the normally open relay contact 180, which is now closed. The current path through the normally open but now closed relay contact 160 of the relay 150, the armature 154, the conductor 182, from the common line conductor 58 is in all respects the same as discussed above with respect to the actuation of the relay 150 by the closing of the thermostatic element 84.

The closing of the normally open relay contact 180 of the relay 170 by the armature 174 is shown in phantom in FIG. 4. The closing of the normally open relay contacts 160 of the relay 150 by the armature 154 is also shown in phantom in FIG. 4. The actuation of the relay 150 is, as discussed above, in response to the temperature rise which causes the thermostatic element 84 to close the thermostat circuit by making contact with terminal 82. The actuation of the relay 170 is accomplished by movement of the slide switch 24 to the high speed position, in which the switch 24 electrically connects the terminal 30 and 28. However, since the current for actuating the relay 170 flows through the thermostat 80, the relay 170 will not be actuated unless relay 150 is also actuated. Thus, the current for actuating both relays 150 and 170 flows through the thermostat 80.

In FIG. 5, the master function switch 13 is shown in the cool position 22, with the sliding contact 14 connected between terminals 108 and 116, and the sliding contact 15 connected between terminals 110 and 120. The blower speed control switch 24 is shown in the high position.

Referring again to FIG. 4, it will be noted in the vent position 20, the pump 46 is off because a current path is not established through the coil 132 of the relay 130. The conductor 104 extends from one side of the relay coil 132 to terminal 100, which is electrically connected by both the slide contact 14 and the conductor 106 to the terminal 108. However, the terminal 108 comprises an open termination for the relay coil 132. The armature 134 is accordingly in its normally closed position, in electrical contact with the terminal 138, thus opening the circuit to the pump 46 with the armature 134 closing the normally closed contact 138 and opening the normally open terminal or contact 140.

With the sliding switch 14 in the cool position 22, as shown in FIG. 5, making electrical contact between the terminals 108 and 116, a current path for the relay coil 132 is established from the conductor 78, through the coil 132, the conductor 104, the terminal 100, conductor 106, terminal 108, sliding contact 14, terminal 116, conductor 114, terminal 110, and conductor 112 to the thermostat 80. With the movable thermostatic contact 84 closed, the current path continues through the element 84, the terminal 82, and conductor 76 to the secondary winding 74. The armature 134 accordingly is moved to its closed position, closing the normally open contacts 140, and thus providing electrical power to the pump 46.

The sliding contact 15, which extends between the terminals 110 and 120, provides power for actuating the relay 150 for turning on the blower 42. The current path for the relay coil 152 of the relay 150 is from the secondary winding 74 through the conductor 78, the coil 152, the conductor 124, the terminal 120, the sliding switch 15, and terminal 110, through conductor 112, the thermostatic element 84 of the thermostat 80, the terminal 82, and the conductor 76 back to the other side of the winding 74.

In the vent position, as shown in FIG. 4, the pump 46 is off, and the blower 42 is responsive to the setting of the thermostat 80. In the cool position, shown in FIG. 5, the pump 46 is on and the blower 42 is on, with both blower and pump being responsive to the closing of the thermostatic element 84. The selection of the speed of the blower is accomplished by the slide switch 24, as adequately discussed above in conjunction with FIG. 4. In FIG. 5 the switch 24 is shown in the high position, between terminals 28 and 30, and the armature 174 is shown in contact with the normally open contact 180, thus providing power to the high speed winding of the motor 42.

The discussion heretofore, in conjunction with the drawings, assumes that the blower motor 42 is a two-speed motor. However, it is obvious that a single speed motor may also be used in conjunction with the apparatus of the present invention. In such case, the motor may still be operated in response to the temperature through the thermostat 80.

Instead of the high and low speed connections 184 and 186, extending to the blower 42 from the terminals 178 and 180, respectively, of the relay 170, a single conductor may be used to connect a single speed blower motor to either terminal 178 or terminal 180. If terminal 180 is used, then the switch 24 must be in the high position in order for the relay 170 to operate. With the switch 24 in the high position, the relay 170 will be actuated at the same time the relay 150 is actuated to provide power to the motor. The relay 150 provides power to the relay 170, and the actuation of relay 170 closes the normally open contact 180, to which the single speed motor may be connected, to provide power to the single speed motor. If the switch 24 is in the low position, the relay 170 will not be actuated.

If it is desired to connect the single conductor to terminal 178, then the switch 124 should be left in its low position. With the single conductor connected to terminal 178, which is the normally closed contact of the relay 170, the armature 174 is in contact with the terminal 178 to complete the circuit between the conductor 182 and the terminal 176 of the relay 170. The relay 170 accordingly should not be actuated, because actuation would open the normally closed contact 178.

A third possibility is connecting the single conductor from a single speed motor directly to terminal 156 of the relay 150. In such case, the relay 170 is bypassed and the setting of the switch 24 is accordingly immaterial for operation of the single speed blower motor. When the thermostat 80 calls for cooling, the relay 150 is actuated and current is provided to the single speed motor direct from terminal 156 of the relay 150.

FIG. 6 comprises an alternate embodiment of the apparatus illustrated schematically in FIGS. 2-5. The modification of FIG. 6 comprises the addition of a conductor 36 extending from terminal 28 to the conductor 76, and the removal or deletion of conductor 34, shown in FIGS. 2-5 as extending from conductor 124 to terminal 28. It will be noted that both conductors 34 and 36 apply only to relay 170 and its armature 174, and the changing of the blower speed from low to high.

When switch 24 is in the high position, making electrical contact between terminals 28 and 30, there is a circuit path established between the secondary winding 74 of the transformer 70 and the relay 170 to energize the relay coil 172. This circuit path is from conductor 76, conductor 36, switch 24, and conductor 32 to the coil 172, and from the coil 172 to conductor 78 and back to the transformer. This causes the armature 174 to move from its normally closed position, where it is in contact with terminal 178, to make electrical contact with the normally open contact 180. In other words, any time the slide switch 24 is in the high position, there will be current flowing through the relay coil 172 to cause the armature 174 to make contact with terminal 180. The conductor 186 extends from the terminal 180 to the high speed winding of the blower 42, and the current path to the motor 42 is accordingly to its high speed windings. However, the blower will of course not be on until the master switch 13 is in either the vent position 20 or the cool position 22 and the thermostat 80 calls for power by closing the contacts 82 and 84. The switch 13 is shown in the vent position 20 in FIG. 6.

When the switch 24 is in the high position, a current flow is established to actuate the relay 170. Even though the current flow through the coil 172 is minimum, since it is powered by only twenty-four volts, there still is current flowing through the relay 170 regardless of the setting of the temperature setting knob 81, shown in FIG. 1, and obviously without regard to the temperature responsive contact or armature 84 of the thermostat 80.

When the switch 24 is in the low speed position, shown in phantom in FIG. 6, the current path to the coil 172 is broken, and the armature 174 returns to its normally closed position, also shown in phantom in FIG. 6, making contact with terminal 178.

With the switch 13 in the vent position 20, as shown in FIG. 6, which is substantially the same as the cool position 22, as far as the blower 42 is concerned, the blower 42 is responsive to the thermostat 80 for actuation of relay 150. When the element 84 moves from its open position, shown in phantom in FIG. 6, to its closed position against terminal 82, the relay 150 is actuated. The armature 154 accordingly moves from its normally closed position, also shown in phantom in FIG. 6, to close the normally open contact 160 to provide power to the motor 42 through the armature 174 of relay 170. This has been discussed in detail, above.

It will be noted that in the embodiment illustrated in FIGS. 2-5, the current for the relays 130, 150, and 170 flows through the thermostat 80. If the combined current flow is relatively small, the circuitry as shown in FIGS. 2-5 is preferred. However, if the current flow is too high, the operation of the thermostat may be hampered. For example, if the motor 42 in the cooler 40 is greater than about a three-quarter horsepower motor, the relays 150 and 170 may be required to carry more current than if the motor were a three-quarter horsepower motor, or even a smaller motor. With a larger motor, the actuating current for the larger capacity relays, now required to carry more current than the original relays 150 and 170, may be too large, when also considering the pump relay 130, to allow the thermostat 80 to function normally. In such a situation, an alternate circuit may be used for the relay 170. Such an alternate is shown in FIG. 6.

The apparatus described herein comprises apparatus for controlling the blower motor 42 and the pump motor 46 in response to the selected setting of the switches 13 and 24. The setting of the switch 13 is in turn responsive to the selected setting of the thermostat 80, which is a function of the selected setting of the temperature setting knob 81 (see FIG. 1) and the position of the temperature responsive element 84.

As illustrated and discussed, three relays 130, 150, and 170 are used as switches to switch an electrical current, which consists of pilot voltage from either a 115 volt line or a 230 volt line, to the motor and to the pump. The relays are in turn actuated by 24 volt signal voltage from the dual transformer 70. The 24 volt signal is used in the control system circuitry 50, which includes the switches 13 and 24, the thermostat 80, and the relay coils 132, 152, and 172.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Control apparatus for controlling electrical current flow including signal voltage and line voltage in an evaporative cooling system having a blower and a pump operated by the line voltage, comprising, in combination:

first switch means selectively connected to the thermostat, to the blower, and to the pump, for selecting one of a plurality of modes of operation of the blower and pump, including a first plurality of terminals, a first switch element movable between some of the first plurality of terminals representing the modes of operation of the pump, a second plurality of terminals, and a second switch element movable with the first switch element between some of the second plurality of terminals representing the modes of operation of the blower;

a thermostat connected to one terminal of the second plurality of terminals, including a pair of contacts, and a temperature responsive element connected to one contact of the pair of contacts and adapted to make contact with the other contact of the pair of contacts upon a temperature rise;

second switch means connected to the pump and to the first switch means and selectively actuable for controlling line voltage for operating the pump in response to the selected mode of operation of the first switch means; and third switch means connected to the blower and to the first switch means and selectively actuable for controlling line voltage for operating the blower in response to the selected mode of operation of the first switch means and of the thermostat.

2. The apparatus of claim 1 in which the first switch means includes a pump only mode in which the first switch element is moved to connect terminals of the first plurality of terminals for connecting signal voltage to the second switch means to actuate the second switch means to provide line voltage to the pump to operate the pump.

3. The apparatus of claim 1 or 2 in which the first switch means includes a vent position in which the second switch element is moved to connect terminals of the second plurality of terminals for connecting signal voltage to the first switch means and to the thermostat to actuate the third switch means to provide line voltage to the blower to operate the blower in response to the thermostat.

4. The apparatus of claim 3 in which the first switch means further includes a cool position in which the first and the second switch elements are moved to connect terminals of the first and second plurality of terminals for connecting signal voltage to the second switch means, to the third switch means, and to the thermostat to actuate the second and third switch means to provide line voltage to the blower and to the pump to operate the blower and the pump in response to the thermostat.

5. The apparatus of claim 4 in which the third switch means includes a first relay actuable by signal voltage to provide line voltage to the blower.

6. The apparatus of claim 5 in which the second switch means includes a second relay actuable by signal voltage to provide line voltage to the pump.

7. The apparatus of claim 6 in which the third switch means further includes a third relay actuable to provide line voltage to the blower when the first relay is actuated.

8. The apparatus of claim 7 in which the third switch means further includes a third switch element selectively movable to provide signal voltage to the third relay to actuate the third relay.

9. The apparatus of claim 1 in which the second switch means is connected to the first switch element for operating the pump, and the third switch means is connected to the second switch emement for operating the blower.

* * * * *